United States Patent [19]

Favret, Jr.

[11] 3,893,918

[45] July 8, 1975

[54] METHOD FOR SEPARATING MATERIAL LEAVING A WELL

[75] Inventor: Uncas Favret, Jr., Metairie, La.

[73] Assignee: Engineering Specialties, Inc., Kenner, La.

[22] Filed: July 24, 1973

[21] Appl. No.: 382,156

Related U.S. Application Data

[63] Continuation of Ser. No. 201,091, Nov. 22, 1971, abandoned.

[52] U.S. Cl. .................... 210/84; 166/265; 208/8; 210/104; 210/170
[51] Int. Cl. ............................................ B01d 17/02
[58] Field of Search ....... 210/83, 84, 104, 110, 115, 210/170, 513, 521, 522, DIG. 21; 166/265; 208/8

[56] References Cited
UNITED STATES PATENTS

| | | | |
|---|---|---|---|
| 2,090,813 | 8/1937 | Schumacher | 210/84 |
| 3,052,621 | 9/1962 | Clark | 210/83 |
| 3,425,556 | 2/1969 | Volker | 210/115 |
| 3,565,252 | 2/1971 | Sheehy et al. | 210/115 |

Primary Examiner—Samih N. Zaharna
Assistant Examiner—Ivars Cintins
Attorney, Agent, or Firm—Burns, Doane, Swecker & Mathis

[57] ABSTRACT

A method for separating material leaving a well wherein an upwardly extending and elongate separator conduit disposed in a water body is supplied with an oil containing fluid mixture at a fluid entrance zone. A plurality of relatively closely spaced inclined baffles spaced along the length of the separator conduit induce separation of oil from that fluid. The baffles define a plurality of quiescent zones for accumulating oil, with the quiescent zones communicating with a tortuous flowing zone established generally centrally of the separator conduit. Oil removal conduits in the form of risers communicate with the quiescent zones and transport the accumulated oil toward a remote location. Provision is made for intermittently impeding the downward velocity of fluid in the flowing zone for a waiting time period sufficient to permit oil particles of a predetermined size to rise from the flowing zone into the quiescent zones.

The waiting time may be provided by controlling an exit valve at the exit zone of the separator conduit in response to sensing of the level of fluid in the conduit with a level control assembly. Alternatively, the exit zone of the separator conduit may be in continuous communication with the water body and the waiting time may be provided by interrupting the supply of fluid to the separator conduit utilizing a level control at a supply tank.

Where the separator conduit is in continuous communication with the water body, potential adverse effects of wave action or tidal changes are minimized by controlling withdrawal of oil from an upper oil layer in the separator conduit in response to sensing, below the mean water level, the interface between that layer and the remaining fluid therebelow.

6 Claims, 13 Drawing Figures

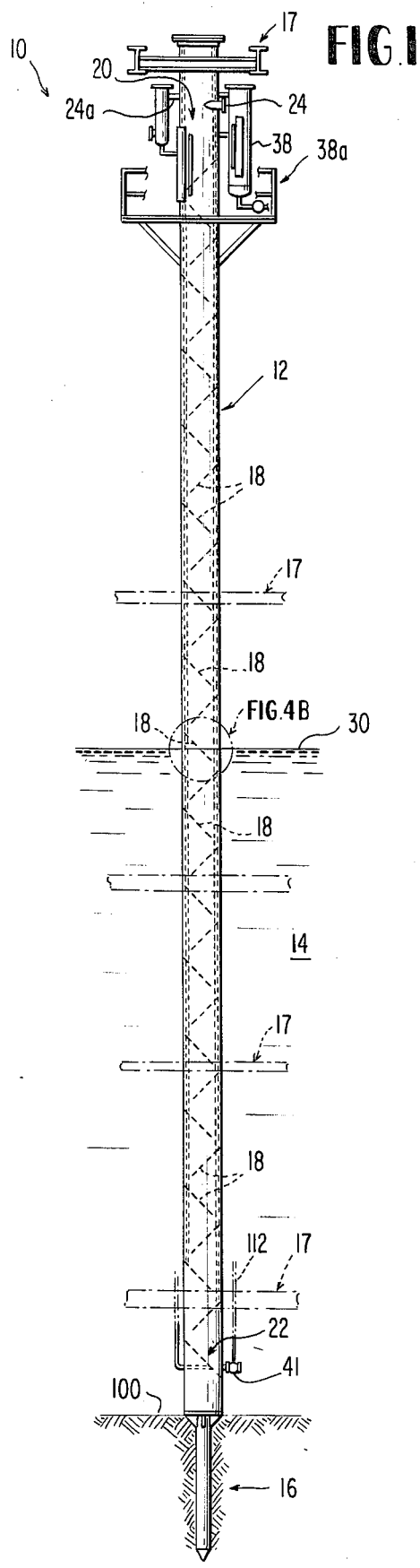
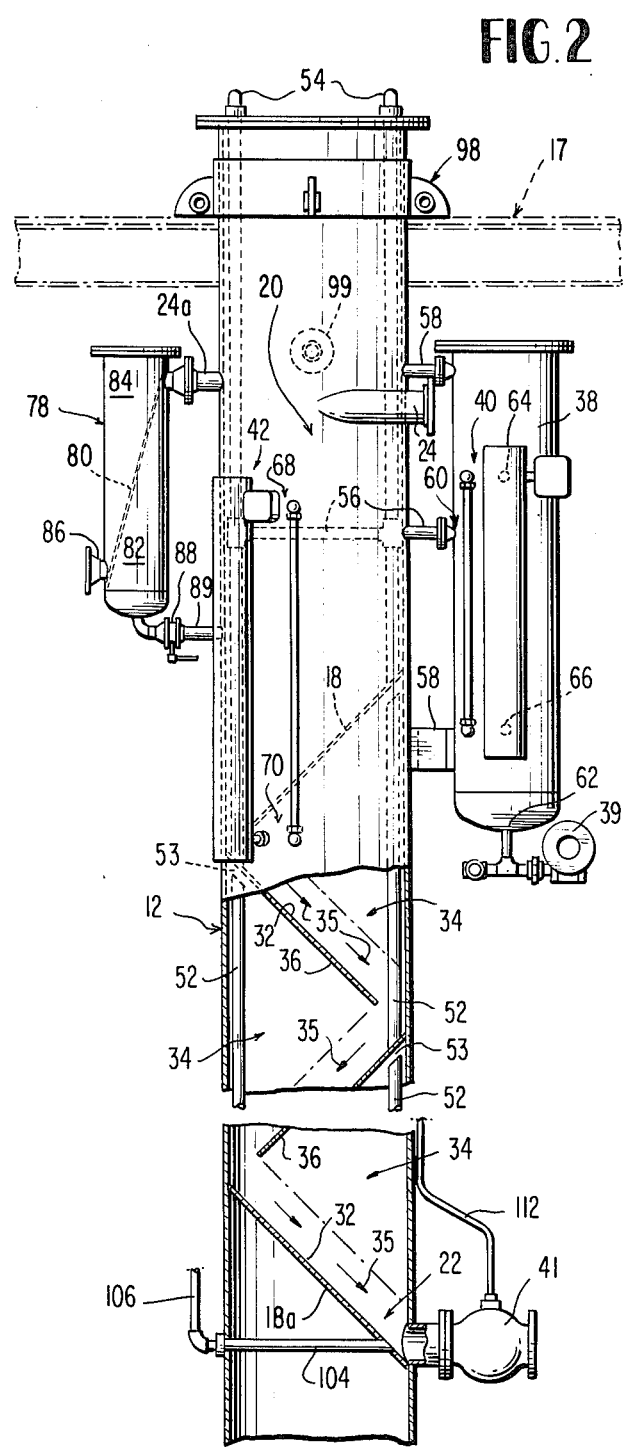
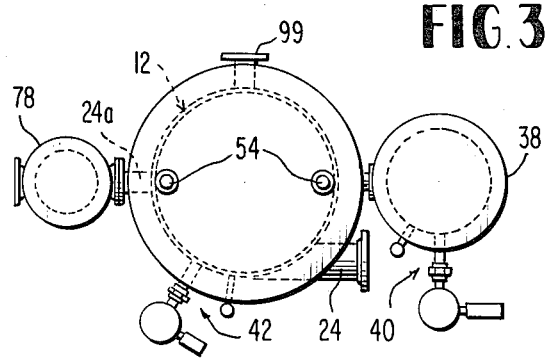

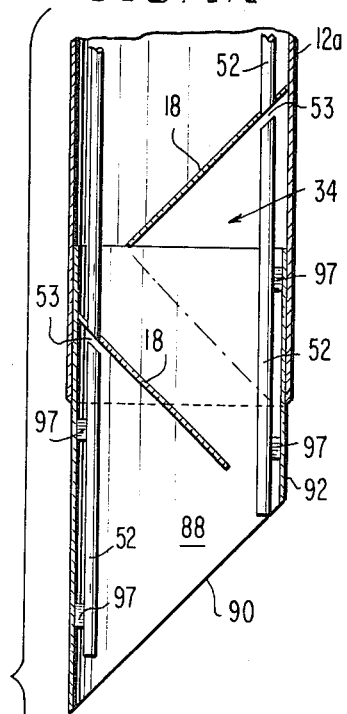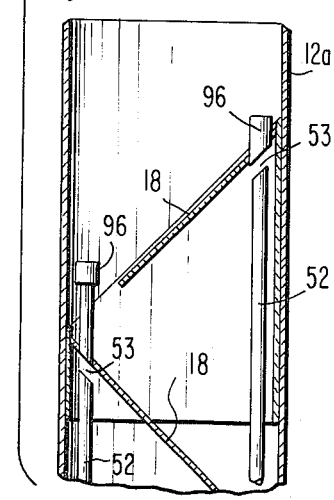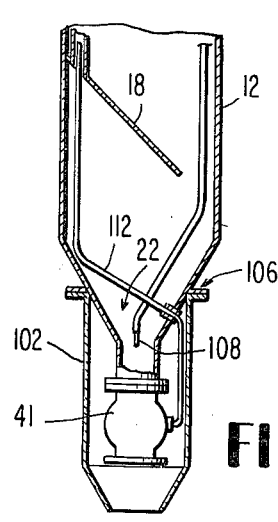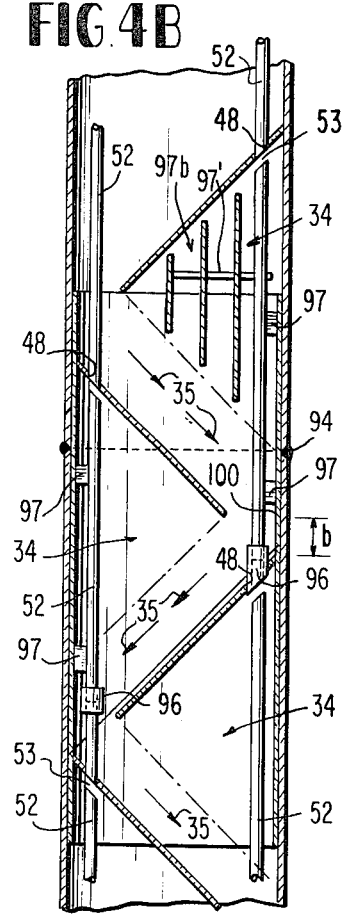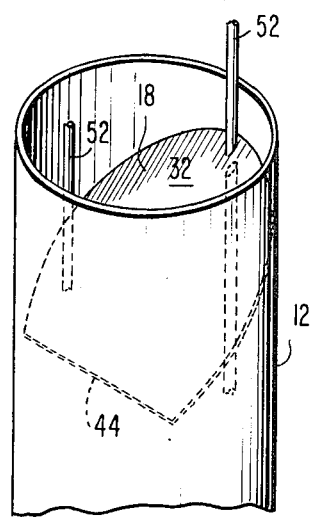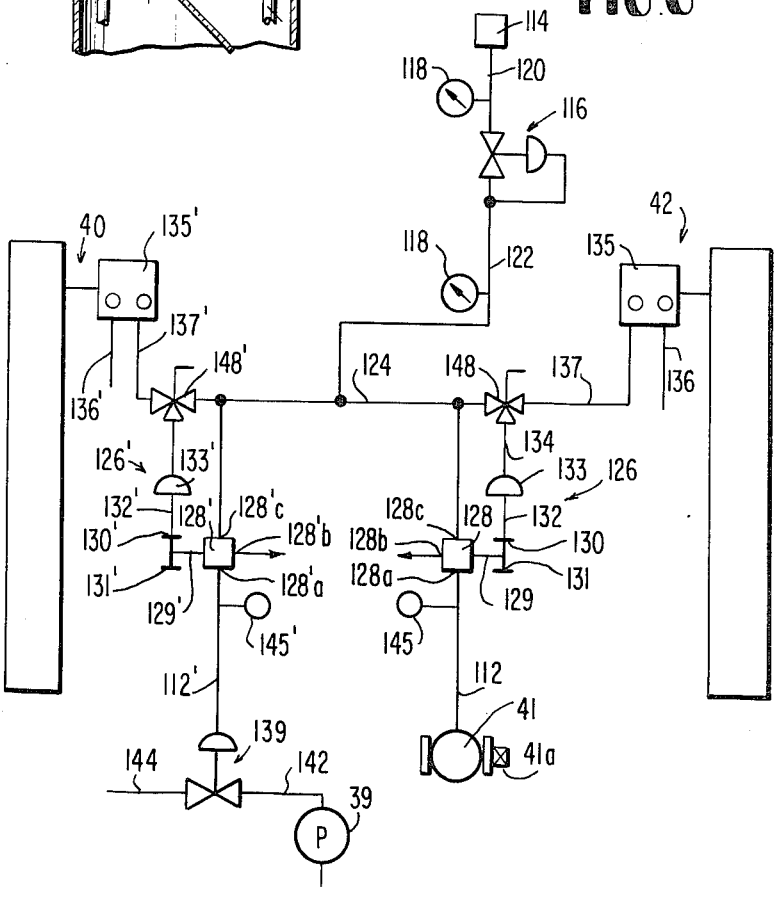

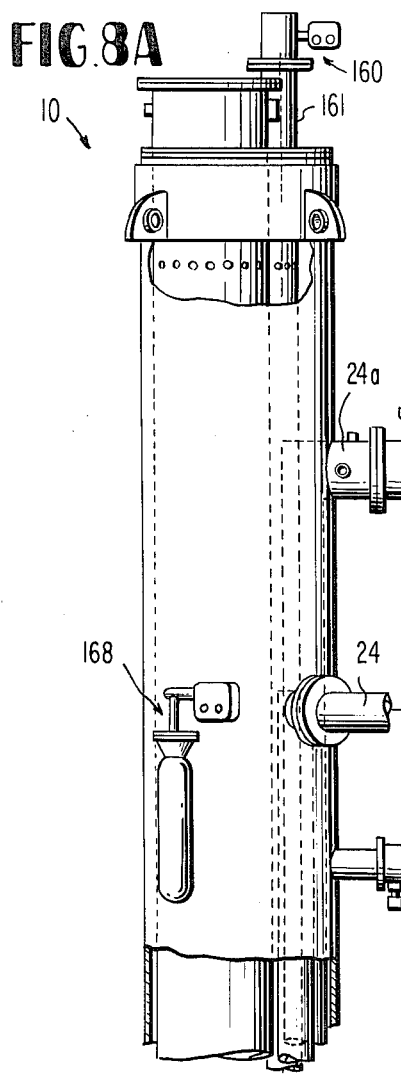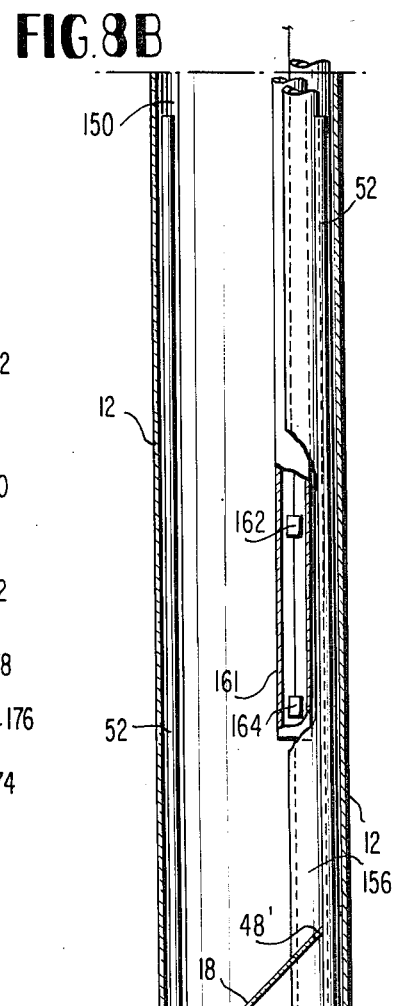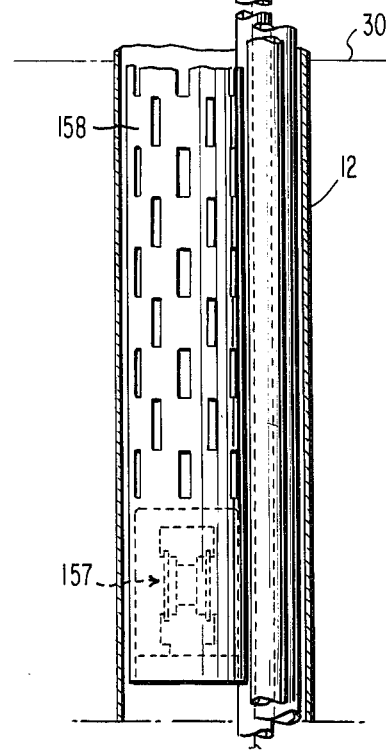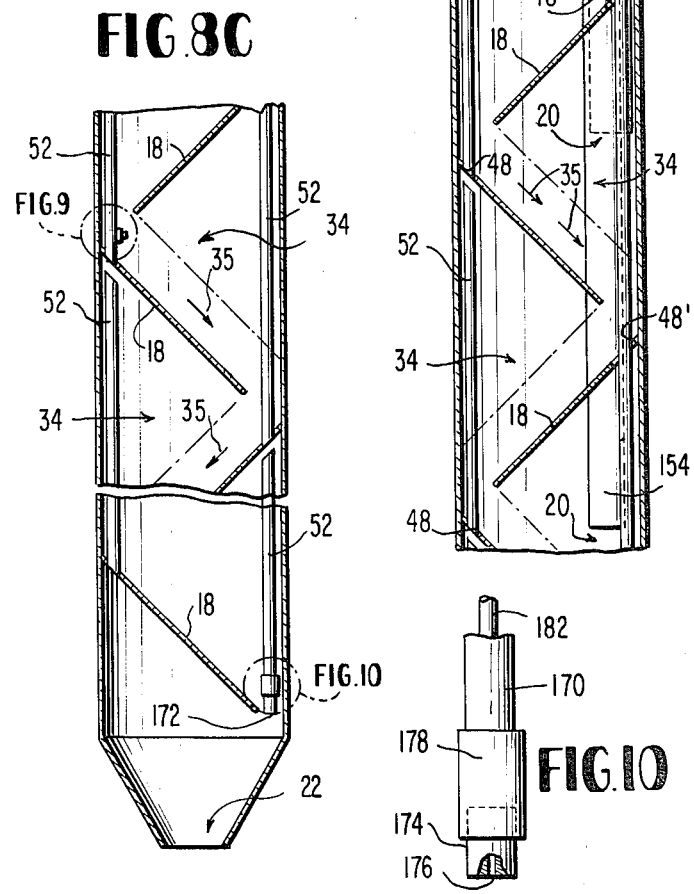

METHOD FOR SEPARATING MATERIAL LEAVING A WELL

This is a continuation, application Ser. No. 201,091, filed Nov. 22, 1971, now abandoned.

BACKGROUND OF THE INVENTION

This invention relates to a method for separating material leaving a well and has applicability to the separation of oil from a mixture of fluids, particularly a fluid mixture such as that produced in connection with offshore drilling which takes place in a body of water into which remaining mixture contents may be discharged.

In the past numerous techniques associated with the recovery of oil from the products emanating from a well have been employed. Often these techniques have involved a variety of separation activities aimed at the provision of usable hydrocarbons. For example, different specific gravities of the products of the drilling may be utilized by pumping the produced fluid into a large tank wherein sand and other particles having the highest specific gravity settle to the bottom. Oil, having a much lower specific gravity, is thus located in an upper region of the settling tank above the lower water layer.

It will, however, be appreciated that the produced water initially separated from the produced fluid is not totally free of oil, and may also contain suspended particles of sand.

The present invention is concerned with the efficient handling of such produced water and other oil containing fluid mixtures. According to the present invention, efficiency of oil recovery may be enhanced utilizing a skim pile assembly including a conduit disposed in a body of water and containing a baffle assembly for inducing coalescent separation of oil from a fluid mixture supplied to the conduit.

Contemporaneously with the development of the present invention, it has been proposed to utilize a baffled conduit disposed in a body of water as a sump for receiving fluid mixtures containing oil. These mixtures may result from the effects of rain water or eminate from skid drains associated with an offshore drilling operation. Although such proposed conduits containing baffle arrangements may be acceptable for some purposes, methods and structures associated with their utilization may not prove acceptable for a variety of reasons.

For example, use of the sumps may not result in oil recovery with a great deal of efficiency. At the same time, such limited oil recovery as may be obtained may also be coupled with the unacceptable disposal into the offshore body of water of oil in amounts that may tend to pollute that water body and its beaches.

It has been recognized according to the present invention that this dual deficiency may in part be attributable to the fact that the baffle spacing envisioned in the use of such sumps entails distances of about ten feet or more.

It would, therefore, be desirable to provide a skim pile assembly wherein baffle spacing of a baffle assembly along a conduit through which oil containing fluid mixtures are passed is designed to enhance efficient recovery of oil and to provide for convenient disposal of remaining materials in an ecologically sound manner. Accordingly the present invention provides for numerous sequential coalescence phenomena by sequential baffling of flow through the conduit numerous times for a given conduit length, utilizing relatively closely spaced baffles.

It would also be particularly desirable to provide for efficient recovery and acceptable disposal through the use of a baffle assembly arrangement for essentially removing oil particles from the main stream of flow through the conduit.

Other disadvantages of the aforementioned proposed sump technique may be appreciated in contrast with the practice of the present invention which is designed to enable efficient handling of large quantities of oil containing fluid mixtures for extended time periods.

As appreciated in the practice of the present invention, continuous or essentially continuous flow through a baffled conduit may not be entirely acceptable for a number of reasons. For example, during flow of an oil containing fluid mixture along the conduit, the exit velocity of the particles of oil would normally exceed their terminal rising velocity attributable to their low specific gravity. As a result, the possibility of disposing of fluid without realizing efficient recovery of valuable separated oil is thereby presented. At the same time, the liklihood of fluid disposal that could result in pollution is present.

It would, therefore, be desirable to provide for the handling of large quantities of produced fluid at a rate consistant with production capacity while at the same time enhancing efficient recovery of separated oil and minimizing pollution problems associated with the disposal of the remainder of the fluid.

Through the present invention, the downward velocity of fluid flowing in the conduit is intermittently impeded for a waiting time period sufficient to break out particles from the flowing zone through the conduit into quiescent zones defined by the baffles. At the same time, large quantities of produced fluid are handled at a rate consistent with production capacity.

As will become apparent, it would also be desirable to provide for a sufficient flowing distance for handling that capacity consistent with the waiting time desired for breaking out small oil particles from the flowing zone into the quiescent zone. in the absence of such a sufficient distance, an increase in waiting time might be resorted to in order to insure that small oil droplets do not remain suspended in the flowing fluid. However, even with such an increased waiting time as might otherwise be sufficient theoretically to break out small particles into the quiescent zone between two properly spaced baffles, the overall separation efficiency may be hampered by reason of the absence of a desirably large number of sequential coalescence phenomena induced by sequential baffling of the flow as pointed out above.

Moreover, such an increased waiting time might not be entirely acceptable from the standpoint of compatability with production capacity.

In addition, the problems of providing the sufficient flowing distance noted above significantly increase in connection with relatively shallow bodies of water wherein desirable flowing distance is not available through reliance on the head of fluid established in the conduit by its communication with that body of water.

It would, therefore, by particularly desirable to provide for enhanced compatibility between flowing distance, production capacity and waiting time even in instances of a relatively small overall flowing distance attributable to the mean depth of the water body in which the conduit is mounted.

Additional disadvantages may be encountered with the use of the aforementioned sump technique by reason of the problems associated with wave action and tidal changes. When a conduit communicating with a body of water supports a standing head of fluid, this fluid head is responsive to changes in the mean water level of that water body. Thus, the level of any accumulated oil at the upper region of that standing head may change as wave action phenomena and tidal changes are encountered.

In instances wherein the accumulated oil level is raised, efficient oil recovery may be hampered. For example, raising of such level may result in poor recovery efficiency by reason of the removal, through a pump or the like, of fluids containing water. At the same time, a fall in the level of accumulated oil may have the ultimate effect of discharging oil into the body of water, particularly insofar as such a reduction in level sets up flow through the conduit thereby effecting waiting time considerations such as those noted above.

It would, therefore, be desirable to provide a skim pile assembly and separation technique wherein problems associated with wave action and tidal changes are accomodated.

OBJECTS AND SUMMARY OF PREFERRED FORMS OF THE INVENTION

It is, therefore, a general object of the invention to provide a method for oil recovery that obviates and minimizes problems of the sort previously noted.

It is a particular object of the invention to provide a novel method for oil recovery wherein the baffle spacing of a baffle assembly in a conduit through which oil containing fluid mixtures are passed is designed to enhance efficient recovery of oil, while at the same time providing for convenient disposal of remaining materials in an ecologically sound manner.

It is a related object of the present invention to provide such a novel method wherein the baffles are arranged to define quiescent zones so that separated hydrocarbons may be essentially removed from the main stream of flow from the conduit.

It is an independent object of the invention to provide a novel method for oil recovery wherein the downward velocity of fluid flowing in a flowing zone of the conduit is intermittently impeded for a waiting time period sufficient to break out oil particles from the flowing zone into quiescent zones.

It is a related object of the present invention to provide such a novel method wherein such impedence is accomplished through control of a valve at the exit zone of a conduit disposed in a body of water.

It is a further related object of the present invention to provide such a novel method wherein such impedence is accomplished through the selective stopping of major flow into the conduit, an exit zone of which is in continuous communication with a body of water in which the conduit is disposed.

It is yet another object of the present invention to provide a novel method for recovery of oil that enables efficient handling of relatively large quantities of produced fluid at a rate consistant with production capacity.

Recognizing the relationship between flowing distance, production capacity, and waiting time desired for breaking out small oil particles from the flowing zone into the quiescent zone, it is still another object of the present invention to provide for compatibility of such variables even where a relatively small overall flowing distance is attributable to the mean water body in which the conduit is mounted.

It is still another independent object of the present invention to provide a novel method for recovery of oil wherein problems associated with the effects of wave action and tidal changes upon fluid in a conduit disposed in a body of water are obviated or minimized.

It is yet another object of the present invention to provide a novel method for separating oil from an oil containing fluid mixture, which method is capable of processing large quantities of fluid over long periods of time.

It is a further object of the present invention to provide a fully automatic novel separator method of this type.

A preferred form of the invention intended to accomplish at least some of the foregoing objects entails the mounting of an upwardly extending and elongate separator conduit means in an offshore body of water. Preferably the separator conduit means is disposed in a substantially upright posture. The conduit means defines an upper fluid entrance zone and a lower fluid exit zone, the latter being communicable with the body of water. These fluid entry and exit zones may be disposed respectively adjacent opposite ends of the separator conduit. An oil containing fluid mixture is supplied to the conduit at the fluid entrance zone, and during flow along the conduit coalescent separation of oil is accomplished by a number of sequential coalescence phenomena induced by sequential baffling of the flow numerous times along the conduit length.

In this connection, the conduit is provided with a baffle assembly including a plurality of baffles relatively closely spaced along the length of the conduit. The spacing between the baffles is less than about ten feet, preferably less than about five feet, and more particularly in the range of about one-half inch to three feet. A six inch spacing has been found to be particularly desirable. The baffles are arranged to define a tortuous flow zone generally centrally of the conduit and along the upper side of the baffles. Preferably this is accomplished through a relatively regular spacing of the baffles staggered alternately transversely of a central axis of the separator conduit. The tortuous path of the input fluid over and around the uppersides of the staggered baffles disposed on generally opposite peripheral portions of the conduit enhances additional coalescence of droplets of oil.

The baffle means of the baffle assembly are generally downwardly sloping or inclined and are positioned relative to one another and relative to the interior of the conduit means so as to define a plurality of quiescent zones adjacent the undersides thereof. In this fashion, oil which finds its way into the quiescent zones is essentially removed from the main stream of flow through the conduit. The inclined baffles are inclined by generally similar angles and substantially transversely fill the inside of the conduit except at their lower free ends. An angle of inclination in the range of about 25° to 65° is desired with a 45° angle particularly preferred.

According to the present invention, the downward velocity of fluid in a flowing zone established in the separator conduit is intermittently impeded for a waiting time period sufficient to break out small oil particles of a predetermined size from the flowing zone into the quiescent zones defined by the baffles. During this waiting time period, the rising velocity of the oil droplets causes the droplets to rise into the quiescent zones by reason of the decrease in the particle exit velocity. Once a droplet has passed into the quiescent zone, it is essentially isolated from the turbulence in the flowing zone, i.e. substantial removal of oil from the accumulation in the quiescent zone is avoided.

When normal flow is again resumed, following the waiting time period, further coalescent separation is accomplished; and subsequent impedance of the flow permits further oil droplets or particles to find their way into the quiescent zones. In this fashion, efficient separation is enhanced.

Generally, the aforementioned waiting time period is chosen so as to permit the smallest droplets of oil to rise out of the flowing zone and into the quiescent zone. In one form of the present invention, provision for the waiting time period may entail intermittently stopping supply of fluid to the conduit by the major fluid supply means while the exit zone of the conduit remains in continuous communication with the body of water in which the conduit is disposed. Control means may be provided for that purpose. This form of the present invention is envisioned to be utilized mainly in connection with deep bodies of water wherein a relatively large flowing distance may be established in the conduit by reason of the standing head supported in the separator conduit communicating with the body of water. This relatively large distance enables handling of large quantities of produced fluid at a rate consistant with production capacity insofar as the waiting time period associated with the supply of such production fluid to the conduit entry zone does not establish either an unacceptably large buildup of fluid or a slowdown of related operations. Such buildup as may be involved may be accomodated by a tank from which the fluid mixture is supplied to the conduit. This tank may itself perform a separating function as a settling tank.

In relatively shallow bodies of water, the waiting time period is preferably provided in connection with exit valve means disposed adjacent the conduit exit zone. The valve means is operable, in a closed position, to establish a fluid column interior of the separator conduit to a height above the mean level of the body of water. In an open position, the exit valve means is operable to provide communication between the separator conduit and the body of water. Control means, preferably in the form of a level sensing means, is operable to control the position of the valve means to provide the waiting time period. Thus, at a predetermined low level of total fluid in the conduit means, the valve means is caused to close for a time period necessary for oil particles of a predetermined small droplet size to rise into the quiescent zones. During this time, essentially continuous supply of fluid to the conduit means entry zone results in a buildup of total fluid in the conduit means. When this buildup reaches a predetermined height above the mean level of the body of water, the level sensing means effects opening of the exit valve. Thus, flow out of the conduit means and downwardly over the baffle means is resumed.

The exit valve means is preferably a gas operable pinch valve means, and the control means may further comprise gas supply means and snap switching valve means for effecting snap closure of the exit valve means by supplied gas in response to the level sensing means operation. The snap closure of the exit valve means appears to result in an upward swirl of fluid, seemingly in the form of a shock, which tends both to coalesce further oil droplets and to force collected oil from the quiescent zones toward a remote location. It may also be desirable to throttle down flow from the separator conduit when the exit valve means is opened. This is believed to aid in avoiding dragging of fluid from the quiescent zones into the flowing zones through excessive turbulence.

It will be appreciated, that the form of the present invention including the exit valve means renders the fluid within the conduit means essentially isolated from the effects of wave action and tidal changes. At the same time, it provides a sufficient flowing distance for handling a capacity of fluid consistant with production capacity at the waiting time desired for breaking out smallest oil particles from the flowing zone into the quiescent zone. Significantly, this is accomplished independently of the small flowing zone distance which may be attributable to the mean level of the body of water.

Provision is made for removal of oil accumulated in the quiescent zones toward a location remote therefrom. This may be accomplished by placing oil removal conduit means in communication with most of the quiescent zones and transporting oil through that conduit means. In the preferred form of the invention, the oil removal conduit means is constituted by a slotted riser means disposed adjacent the periphery of the conduit means internally thereof, and slotted to communicate with the quiescent zones. In this fashion, oil accumulated in the quiescent zones flows up the riser to a hydrocarbon removal zone. Preferably the riser means comprises generally axially aligned riser sections communicating at their lower ends with the quiescent zones through the baffle means.

In the embodiment of the invention wherein the conduit means is provided with exit valve means, the oil removal zone is established by an oil collection chamber communicating with the riser means adjacent the upper end thereof. Preferably this chamber is located adjacent to but externally of the separator conduit means so as to maximize the fluid capacity of that conduit. A pump or other suitable means is associated with the oil collection chamber to transport the oil to any suitable location in any suitable manner. In this connection, a level control means associated with the oil chamber may be employed to effect operation of the pump means after predetermined accumulation of oil in the oil collection chamber, and to stop operation of the pump means after the level in the collection chamber has decreased by a predetermined amount.

In the embodiment of the present invention wherein the conduit means is in continuous communication with the body of water, the slotted risers may be opened at their upper ends so as to communicate directly with an upper region of the conduit means. A suitable pump or other oil withdrawing means may be disposed in that upper region at a fixed location to remove the accumulated oil.

As will be apparent, the oil so accumulated establishes an upper oil layer, the level of which in the separator conduit is responsive to changes in the mean water level of the water body communicating with that conduit. Of independent significance, is the provision in the present invention for controlling the oil removal from the upper layer so as to minimize adverse effects of wave action or tidal changes. This may be accomplished through the provision of interface sensing means for sensing, below the mean level of the water body, the interface between the established upper layer of oil and the remaining fluid in the conduit below that layer. This interface sensing means may comprise level sensing means which at a predetermined low interface level causes the pump means to operate so as to withdraw oil from the upper layer.

During such withdrawal, it will be appreciated that the oil-water interface rises by reason of the communication between the separator conduit and the body of water. When the interface reaches a predetermined high level, the interface sensing means is operable to disable the pumping operations of the pump means.

In the foregoing fashion, the effects of tidal changes and wave action are minimized to the extent that pumping operations are controlled so as to take place at times when the pumping of oil essentially free from water will take place. Moreover, the level of accumulated oil is not permitted to drop to a zone which might undesirably result in pollution of the body of water communicating with the separator conduit.

In the same embodiment of the present invention, efficient oil recovery is further enhanced insofar as the fluid entry zone of the separator conduit is established through supply conduit means communicating with the separator conduit below the predetermined low interface level. In this fashion, mixing of the accumulated oil with the supply fluid is minimized. Further is this connection, the aforementioned risers are not slotted adjacent the baffle means located in proximity to the fluid entry zone. Thus the possibility of water entering the upper oil layer through the risers is further minimized.

As hereinafter more fully described, the skim pile assembly of the present invention may be utilized in connection with any one or more selected fluid supply means, i.e. fluid may be supplied to the conduit means from skid drains, settling tanks, etc. Moreover, the well operation associated with the skim pile assembly may be controlled so that upon a predetermined high level of fluid within the separator conduit, well operations are caused to cease by high level shut down means.

The various controls associated with operation of the skim pile assembly may be pneumatically monitored in a matter hereinafter more fully described.

According to the present invention, improved oil recovery and minimization of pollution problems may be realized. For example, supply of fluid containing 300 to 400 parts per million of oil to the skim pile assembly with disposal of fluid containing 17–90 parts per million of oil may be accomplished. This result is sufficient to meet prevailing Federal standards concerning fluid disposal into the body of water.

In this connection, provision may be made, according to the present invention, for testing the oil content of fluid leaving the conduit means of the skim pile assembly. This may be accomplished through fluid sampling means for withdrawing fluid from the exit zone of the separator conduit.

Other objects and advantages of the present invention, particularly the utility of certain forms and features of the present invention apart from direct positioning in a body of water, may be understood from the following detailed description of preferred forms thereof with reference to the accompanying drawings in which like numerals refer to like elements and in which:

THE DRAWINGS

FIG. 1 is a side elevational view schematically depicting a skim pile assembly disposed, by spiking, in a body of water according to the present invention, with clamp means which may be alternatively employed to position the assembly being shown in phantom.

FIG. 2 is an elevational view, partially in section and partially broken away, of the skim pile assembly shown in FIG. 1;

FIG. 3 is a top plan view of the skim pile assembly shown in FIG. 2;

FIG. 4A is an elevational assembly view, partially in section, depicting a stabbing guide connection between portions of a skim pile assembly according to the present invention;

FIG. 4B is an illustration showing the portions of the assembly depicted in FIG. 4A in an assembled posture;

FIG. 5 is a pictorial view of a portion of the skim pile assembly according to the present invention illustrating a preferred baffle means orientation;

FIG. 6 is a schematic illustration of a control system for a skim pile assembly according to the present invention;

FIG. 7 is a cross-sectional elevational view of an alternate form of the lower portion of the skim pile assembly;

FIGS. 8A, 8B, and 8C together provide a side elevational view, partially broken away and partially is section, of another preferred form of the skim pile assembly according to the present invention with FIG. 8B providing a longitudinal continuation of FIG. 8A, and FIG. 8C providing a longitudinal continuation of FIG. 8B.

FIGS. 9 and 10 are detail views of sampling arrangements respectively at two levels of the skim pile assembly depicted in FIG. 8C.

DETAILED DESCRIPTION

General Summary:

With reference to FIGS. 1–10, preferred forms of a method and apparatus for recovering oil from an oil containing fluid mixture may be understood.

As may be seen schematically in FIG. 1, a skim pile assembly 10 according to the present invention includes an elongate, upwardly extending, separator conduit 12 disposed in an offshore location adjacent, for example, an offshore drilling or production rig (not shown). The conduit 12 is mounted, through any suitable means and preferably in a substantially upright posture in a body of water 14 such as the Gulf of Mexico.

For this purpose, a spiking arrangement 16 hereinafter more fully described may be employed as a mounting means. Alternatively, mounting means suuch as conventional clamps 17 (illustrated in phantom) may be employed to clamp the conduit 12 in position by, for example, clamping it to the production platform. Generally, a spiking arrangement 16 is the preferred mounting means where conduits, etc. associated with the skim pile operation are disposed externally of the skim pile assembly 12 as hereinafter noted. Clamps 17 may, however, be efficiently employed where such conduits, etc. are disposed internally of the skim pile assembly at a location where interference with the clamps is precluded.

Internally of the conduit 12, the skim pile assembly 10 includes a baffle assembly comprised of a plurality of relatively closely spaced baffle means 18 spaced along the length of the conduit. The baffle means induce coalescent separation of oil from an oil containing fluid mixture supplied to the conduit 12.

As schematically shown in FIG. 1, the baffle means 18 are disposed in overlapping, zig-zag fashion and are preferably generally regularly spaced along the conduit 12 from adjacent an upper fluid entrance zone 20 to a lower fluid exit zone 22, both of which are defined internally of the conduit, preferably adjacent opposite ends thereof.

Suitable supply means indicated at 24 communicates with the conduit 12 to provide a supply of the oil containing fluid mixture at the fluid entrance zone 20. One or more supply means may be provided and an additional supply means is illustrated at 24a. Generally, one such supply means 24 constitutes a supply conduit coupled in any suitable manner to a source of produced fluid, i.e. "produced water," provided by the production operation. This produced water may, if desired, be processed at a settling tank prior to entry into the supply conduit. The illustrated additional supply means 24a may be comprised of a conduit for supplying fluid from skid drains, rain water or the like.

In the embodiments illustrated in FIGS. 1-6 the supply conduits provide fluid to the separator conduit entrance zone 20 preferably at a location above the uppermost baffle means 18. According to these embodiments of the present invention, this entrance zone 20 location is also disposed above the mean water level, indicated at 30, of the water body 14. However, in accordance with the embodiment hereinafter more fully described in connection with FIGS. 8A-8C, the entrance zone 20 of the separator conduit 12 is located below that mean water level 30. In both instances, however, the exit zone 22 is preferably disposed adjacent the lowermost submerged end of the separator conduit 12.

During flow of fluid from the entrance zone 20 to and out of the exit zone 22, the main fluid flow occurs through a tortuous flowing zone along the uppersides 32 (see FIGS. 2 and 5) of the baffle means 18 and defined by the baffle means 18 generally centrally of the separator conduit 12. As will become apparent, each of the plurality of baffle means 18 is also positioned relative to the others and relative to the interior of the conduit 12 so as to define a plurality of quiescent zones adjacent the undersides 36 of the baffle means (see FIGS. 2 and 4).

These quiescent zones are schematically depicted at 34 as being bound by the undersides of the baffle means, the inner periphery of the separator conduit 12 and an imaginary dotted line parallel to the next lowermost baffle means but emanating from the lower end of the baffle means thereabove (see FIGS. 2 and 4). The tortuous flow zone may be considered to be along the arrows 35 outside the quiescent zones 34 in a generally central region of the conduit.

Oil removal conduit means, hereinafter more fully described, communicate with the quiescent zones 34 for transporting the oil accumulated therein toward a remote location. In the embodiment of the present invention depicted in FIGS. 1-3, this remote location may be constituted by an oil collection chamber 38.

Preferably, this chamber 38 is located externally of the separator conduit 12 adjacent a platform 38a (which may function as a landing deck or walkway) suitably supported near the upper end of the conduit 12. The external location of the chamber 38, when employed, enhances oil recovery efficiency by maximizing usable separating space within the conduit.

A pump 39, or other suitable means may be employed to withdraw oil from the collection chamber 38. In this connection, an oil level sensing means 40 (see also FIG. 3) may be utilized to control the pump 39.

As subsequently more fully described in connection with FIGS. 8A-8C, the remote location to which oil is transported from the quiescent zones 34 may, in some instance be constituted by an oil layer forming the upper portion of the contents of the separator conduit 12.

In either event, provision is made for enhancing accumulation of separated oil in the quiescent zones 34. For this purpose, the downward velocity of fluid in the flowing zone (i.e. along the arrows 35) is intermittently impeded for a waiting period sufficient to permit oil droplets or globules to rise from the flowing zone into the quiescent zones 34.

This waiting time period may be produced by control of a valve means 41 located adjacent the exit zone 22. This manner of producing the waiting time period may be more fully appreciated in conjunction with FIGS. 1-7. The valve means 41 is operable, in a closed position, to establish a fluid column interior of the separator conduit 12 to a height above the means water level 30. As will be apparent, this occurs by reason of the fact that, when the valve means 41 is closed, fluid supplied to the entry zone 20 of the separator conduit 12 will build up within that conduit.

A control means 42 is operable to control this build up, preferably at least until the fluid level in the conduit 12 reaches a level above the uppermost baffle means 18. Thereafter, the control means 42 causes the valve means 41 to open.

In its open position, the valve means 41 is operable to provide communication between the exit zone 22 of the separator conduit 12 and the water body 14. Thus, flow through the conduit is resumed.

The control means 42, upon sensing a predetermined drop in the fluid level in the conduit 12, again causes the valve means 41 to close. As hereinafter noted, the control means 42, while functioning as a level control means, performs a timing function related to the waiting zone period earlier discussed.

In other forms of the invention where an exit valve means 41 or the like is not provided, the waiting time period may be provided by rendering intermittent the supply of fluid to the separator conduit 12 which remains in continuous communications with the water body 14 at the exit zone 22. This manner of providing the waiting time period may be more fully appreciated in connection with FIGS. 8A-8C.

As will become apparent in conjunction with those FIGS. 8A-8C, of particular utility with that form of the invention is the provision for also minimizing problems associated with wave action and tidal changes despite the continuous communication between the water body 14 and the separator conduit 12. This is accomplished through sensing of the interface between the oil and water, which interface is located below the mean water level at the upper end of the separator conduit. Withdrawal of oil in response to that sensing is then monitored as hereinafter more fully described.

Detailed Structure and Operation:

With reference now to FIGS. 2–6, further details of a preferred form and operation of the skim pile assembly 10 schematically depicted in FIG. 1 may be understood.

As earlier noted, the skim pile assembly 10 includes the separator conduit 12 containing the baffle means 18. The conduit may be of any suitable internal diameter, e.g. approximately 32–40 inches, and of any suitable wall thickness, e.g. ⅜ inch, to accomodate the pressures and flow involved in recovery of oil according to the present invention.

To enhance the handling of large quantities of produced fluid at rates consistant with production capacity and the aforementioned waiting time period, and, at the same time, to provide sufficient conduit length 12 to enable the desirable number of sequential coalescence phenomena to be induced by the baffle means, the conduit 12 is provided with the valve means 41 and extends well above the mean water level 30. This form of the invention is envisioned to be of utility in all water depths, but is of particularly advantageous utility in relatively shallow water bodies. In such shallow water bodies, a flowing distance well in excess of that attributable to the mean water level 30 may be provided. For example, an overall conduit length providing an effective flowing distance of about two times the height of the mean water level 30 may be employed. Throughout essentially this entire flowing distance sequential baffling takes place.

As may be seen in FIG. 4, the baffle means 18 may take the form of generally elliptical plates with one end removed. These inclined plates project transversely of the central axis of the separator conduit 12, and have major and minor axes such that flow occurs along the uppersides 32 of the baffle means 18 since, as will be appreciated, the baffles substantially fill the condiut 12. The staggered baffle means 18 are disposed preferably at an angle of about 25° to 65°, 45° being preferred, with respect to the longitudinal axis of the generally upright conduit 12, and may be suitably connected thereto by welding or the like along their entire preiphery apart from the lowermost peripheral portions thereof, indicated at 44.

These free lowermost portions 44 are spaced from the internal periphery of the separator conduit to permit flow around the baffles along the flow path schematically indicated by the arrows 35. The spacing between baffles is relatively small, e.g. about 6 inches, as viewed in elevation.

Since downward and upward flow around the baffles is substantially precluded except at their lowermost peripheries 44, the undersides 36 of the baffles define, together with the internal periphpery of the conduit 12, the quiescent zones 34, outlined schematically in the drawings.

These quiescent zones may, in the illustrated embodiments be considered to take in form of isosceles triangles in side elevation. At the same time, the flowing zones may be considered to take the form of abutting trapezoids in side elevation, with the trapezoids inclined at the angle of the inclination of the baffle means 18. These triangular and trapezoidial configurations result from the regular spacing and superposition of the baffle means 18 over one another (with the relatively small spacing between the free peripheral portions thereof and the conduit inner wall) as illustrated.

According to the present invention, the baffles 18 are relatively closely spaced for a variety of reasons. In the first instance, the close spacing provides a large number of coalescence phenomena. Also, during the waiting time period provided by flow interruption, relatively small oil particles having relatively small terminal rising velocities are induced to enter the quiescent zones 34 by reason of the small distance of these zones from the center of the flowing zones.

It will be appreciated that the distance which a given oil droplet or particles must rise to enter the quiescent zones 34 is a function of the baffle geometry and may be varied, for example, by changing the spacing between the baffles 18. The spacing between the baffles 18 in the illustrated arrangement may be considered to be measured as the vertical distance between the lower terminus 44 of one baffle 18 and the upper terminus of the baffle 18 immediately therebelow. According to the present invention, this spacing is less than about ten feet, preferably less than about five feet, and more particularly in the range of about one-half inch to 3 feet.

Each baffle 18 is provided with an aperture 48 (see FIG. 4) adjacent the upper terminus thereof, and each of the apertures 48 communicates with the quiescent zone 34 defined beneath the associated baffle. Thus, oil which rises to the top of the quiescent zones communicates with the aperture 48.

The apertures 48 communicate with the lower end of a section of a riser means 52. These lower ends may be welded or otherwise suitably secured to the associated baffles 18 so as to completely block any rise of oil above the baffles 18 through the aperture 48. In this fashion, oil passes from the quiescent zones into the riser means sections 52 so as to be continually directed upwardly of the separator conduit means 12.

Each section 52 of the riser means located below the two uppermost baffles 18 extends upwardly of the baffle 18 to which it is attached to a location indicated at 53 spaced from but adjacent to the aperture 48 in the next similarly inclined baffle 18. The upper ends of the remaining riser means sections 52 are thus open to communicate with the quiescent zones, but the upper ends of the uppermost riser means sections 52 are blanked by any suitable means such as caps 54 (FIGS. 2 and 3). These caps 54 may be conveniently removed at an appropriate time to clean the riser means from paraffin or the like through a ramrod technique.

The riser sections 52 together form the previously noted oil removal conduit means which communicate with the quiescent zones 34 for transporting the oil accumulated therein toward a remote location. The transportation occurs by reason of the rising tendency of separated oil. As may be seen in FIG. 2, two riser means are located in generally diametrically opposed positions along the interior of the separator conduit 12. Each of the sections 52 of the respective riser means may be generally axially aligned as illustrated to serve essentially as a continuous conduit while the sections with open upper ends permit entry of oil into that conduit at each quiescent zone through the baffle apertures 48.

It will be apprent that although described as a series of sections 52 in the preferred form, the riser means may take the form of a truly continuous conduit suitably slotted to communicate with each quiescent zone 34 through which it passes. Also, the riser means may be located by suitable clamps or the like along the outside of the separator conduit 12, and may be provided with suitable "tap" conduit means communicating with each quiescent zone 34 through the separator conduit wall.

Other oil removal conduit means arrangements are alternatively envisioned as may be appreciated. For example, several conduit means, one each associated with one or several quiescent zones may be employed with or without suitable pump means.

With continued reference to FIG. 2, it may be seen that the upper riser sections 52 communicate, through suitable connecting conduit means 56 with the oil collection chamber 38. As illustrated, the collection chamber 38 communicates, through the connecting conduit means 56, with the uppermost riser means sections at a zone 60 located above the uppermost baffle 18.

The chamber 38 is, as earlier noted, preferably located externally of the separator conduit 12, and is supported thereby through suitable connecting means such as those indicated at 58. It is, however, envisioned that the chamber 38 may be located internally of the separator conduit 12 and supported therein in any suitable manner.

Communicating with the collection chamber 38 in any suitable manner at a lower zone 62 thereof is the previously identified pump means 39. This pump means 39 is operable to withdraw collected oil from the chamber 38 and to transport that oil to a suitable location.

Operation of the pump means 39 may be controlled in any suitable manner such as by means of the oil level sensing means 40. This control means 40 is operative to sense an upper oil level at a collection chamber location indicated generally at 64, and to thereby cause the pump means 39 to operate in response thereto. When the level of collected oil reaches a predetermined low level indicated generally at 66, the pump means 39 is caused to cease operation.

Further details of the structure and operation of the level sensing means 40 and the pump means 39 are hereinafter described in connection with FIG. 6. At this point it may be noted that the pump means 39 may be of any suitable type but is preferably a gas operated pump, such as a 9000 series double diaphragm pump of the type available from Texstream Corporation, Houston, Tex.

The oil removal level sensing means 40 may also be of any suitable type, with the level control means 40 schematically depicted being a gas operable 48 inch range, direct action liquid level control with a 3–15 psi output and a 20 psi supply, of the model 12820 type available from Masoneilan International, Norwood, Mass. and more fully described in their Bulletin No. 405.

The previously identified control means 42 operable to control the valve means 41 so as to control the aforementioned waiting time employed to permit the rising velocity of oil particles to cause transfer of oil into the quiescent zones 34 may be a sensing means of the same general type as the sensing means 40 employed in connection with the collection chamber 38. The controlled valve means 41 may itself be of any suitable type but is preferably a gas controlled pinch valve, such as an 8 inch type DW valve available from Red Valve Company, Inc., Carnegie, Penn.

With continued reference to FIG. 2, it may be seen that the separator conduit level control means 42 may be suitably mounted externally of the separator conduit 12, and communicates with the interior sensing locations of that conduit at two spacing levels indicated generally at 68 and 70. The uppermost of these sensing levels or zones 68 is located above the first baffle 18 and the lower sensing zone 70 is preferably disposed below the lower terminus of that baffle so as to prevent accumulation of coalesced oil in the upper region of the conduit 12 without permitting that oil to enter the collection chamber 38 through the riser means.

Upon sensing of a drop in fluid level within the separator conduit to the lower sensing zone 70, the level control means 42 causes the valve means 41 to close thereby permitting a buildup of fluid in the separator conduit. When this fluid reaches the upper sensing zone 68, the level control means 42 causes the exit valve means to open.

Further details of the structure and operation of the control provided by the control means 42 are hereinafter discussed in connection with FIG. 6. At this juncture it may be noted that the spacing between the upper and lower level sensing zones 68 and 70 is chosen to provide the desired waiting time consistent with both the handling of the expected quantities of fluid and the selected baffle spacing and flowing zone length.

For example, assume that the supply means 24 (which supplies the major flow of the oil containing fluid mixture to the entrance zone 20 of the separator conduit) is expected to supply production fluid from a well in an essentially continuous fashion at the rate of about 2000 barrels per day. For present purposes it may also be assumed that the separator conduit 12 provides an available flowing zone length along that conduit 12 of about 40 feet. With a selected relatively close baffle spacing of about 6 inches and with a vertical extent between the termini of the preferably similarly inclined baffles 18 of about 2 and 178 feet, 13 baffles may be employed in that flowing zone length.

Employing that number of baffles in the flowing zone length tends to maximize the number of coalescent separation phenomena during flow through the separator conduit and also tends to maximize the number of locations at which flow into quiescent zones may take place. It also tends to minimize the distance required for oil particles to rise out of the flowing zone into the quiescent zones 34.

This required rising distance may be calculated for the geometry employed, and for present purposes may be assumed to be represented by the baffle spacing $b$ (FIG. 4B) of 6 inches, since the selected preferred angle of baffle inclination, i.e. 45°, is regular and the lower and upper termimi of adjacent staggered baffles 18 are aligned when viewed in elevation (i.e. the imaginary extension of each of the inclined baffles beyond their lower termini intersects the upper end of the next lowermost baffle).

A trial spacing between the upper and lower sensing zones 68 and 70 may be selected, and then it may be calculated whether this spacing provides the desirable waiting time to handle the capacity at the chosen baffle spacing. With a selected sensing zone spacing and taking into account the quantity of fluid that may occupy the interior of the separator conduit 12 in that spacing, the calculation is as follows:

$$T = \frac{Q \times S}{R}$$

where:
Q represents the quantity of fluid that may occupy the space between the upper and lower sensing zones;
S represents the spacing between such zones;
R represents the rate of supply of fluid to the separator conduit; and
T represents the calculated waiting time.

It will be apparent that $Q$ may be readily calculated for the given fluid and conduit size, and for present purposes it may be assumed to be equal to about 1.25 barrels per foot in connection with a separator conduit of about 36 inches internal diameter. Thus, with a selected 4 feet distance between the upper and lower sensing zones 68 and 70, and with an essentially continuous expected input of about 2000 barrels per day, the waiting time $T$ may be calculated to be about 216 seconds. This waiting time period is acceptable insofar as it does not unnecessarily delay the essentially continuous operation.

It may therefore, be seen that the waiting time period is controlled by the selected spacing between sensing zones 68 and 70 of the level control means 42. The calculated waiting time may then be utilized to determine whether the selected baffle spacing is appropriate.

As earlier noted, the waiting time and baffle spacing, etc. are selected so that the exit valve means 41 is maintained in a closed position for a sufficient time to theoretically permit the breaking of the smallest oil particles from the flowing zone into the quiescent zones 34 with a given production fill rate. The sufficiency of these selections for the above calculations may be verified by taking into account a terminal rising velocity of oil particles of about 0.0036 feet per second. With the calculated time of 216 seconds, the distance of permitted rising into the quiescent zones during the waiting time is less than 10 inches. This ten inch distance favorably compares with the earlier noted 6 inch baffle spacing that represents the required distance of rise into the quiescent zones.

The terminal rising velocity utilized in the calculation above represents the rising velocity of oil particles of 50 microns or larger with a particular oil. It will be recognized that the terminal rising velocity to be employed in theoretical computations may be calculated by the skilled artisan. Fluid characteristics such as particle size, difference in specific gravity, and viscosity should be taken into consideration.

Through the foregoing, it will be apparent that the appropriate relationships for production fill rate, selected baffle spacing and level control sensing zone spacing, etc. may be found for any given system by proceeding with a calculation similar to that outlined above.

With renewed reference to FIG. 2, it may be seen that in practicing the present invention, additional sources of fluid supply to the separator conduit 12 may take the form of the conduit 24a associated with a filter chamber 78.

This filter chamber 78 may include an inclined strainer structure 80 dividing the chamber into first and second zones 82 and 84. One of these zones 82 communicates with the supply conduit 24a at an upper location of the zone 82 to supply filtered fluid to the separator conduit 12. The filtered fluid enters that zone 82 through the strainer 80 from the other chamber zone 84. The lower portion of this latter zone 84 communicates with a conduit 86 leading to sources of casual water such as rain water which has washed over oily surface.

As will be apparent this water is filtered by the strainer 80 to remove objects capable of fouling the flow in the separator conduit 12. The low level of entry of this water into the chamber 78 also functions to prevent backup of fumes by reason of the higher exit level.

A manually operable valve 83 may be located at the bottom of the chamber zone 82 adjacent a connecting member 89 that provides support for the chamber 78 on the separator conduit. This valve may be opened to clean out the chamber 78.

With reference now particularly to FIGS. 4A and 4B a preferred technique for assembling the skin pile assembly of the present invention may be understood. According to this technique, the separator conduit 12 is comprised of a plurality of elongate sections 12a. Each of these sections includes properly spaced and oriented baffles 18 and riser sections 52 associated with that portion of the conduit means.

In order to provide for the interconnection of the section 12a of the separator conduit 12, the lower portions of intermediate ones of these sections are provided with a downwardly projecting tubular flange 88. As indicated at 90, the flange is cut off at an angle commensurate with the angle of inclination of the baffles 18. The remaining uncut portion 92 of the flange has a vertical extent approximately equal to the distance between the upper end of the conduit section 12a to be connected and the upper end of the uppermost baffle therein. In this fashion, the flange which has an external diameter slightly less than the internal diameter of the conduit section functions as a stabbing guide to enable the conduit sections to be assembled while the baffles remain properly spaced and correctly oriented.

This assembly is illustrated in FIG. 4B. As shown at 94, the two sections 12a of the separator conduit may be welded together in assembled relationship. In this connection, the tubular flange 88 acts as a chill ring to facilitate welding.

The upper end of conduit sections to be connected with another conduit section that has a stabbing guide flange 88 includes collars 96 (FIG. 4A) at the upper ends of the riser sections. Upon assembly of the conduit sections 12a, these collars 96 provide a continuous riser section intermediate adjacent baffles by surrounding the lower ends of the riser sections from the other conduit section (FIG. 4B). Suitable mounting brackets 97 may be employed to fix the riser sections to the separator conduit.

At this juncture it may be noted that a further bracket assembly 97' may be employed to support longitudinally extending baffles of an additional baffle assembly 97b which may be employed to divide the quiescent zones 34 into longitudinal sections. This arrangement is envisioned to aid in preventing drag of oil from the quiescent zones 34 into the flowing zone when flow is taking place. In other words, it is thought that the flow rate can be increased without increasing the liklihood of disturbance of the quiescent zones even with turbulent flow in the flowing zone. For clarity, only one such longitudinally extending baffle assembly 97b is illustrated and then only in FIG. 4B, but it will be appreciated that some or all of the other quiescent zones 34 may be provided with such an assembly.

Returning now to FIG. 2, it may be seen that the conduit sections 12a of desirable length may be provided with flanges 98 which function as lifting eyes to which a crane may be attached to aid in assembly and disassembly. It may also be seen that the uppermost conduit section is provided with a gas vent 99. This gas vent communicates with the upper regions of the separator conduit and may be connected to a flash arrester (not shown) to provide a vent into the atmosphere.

The lowermost of the conduit sections of the separator conduit 12 is, of course, provided with the previously identified valve means 41. In the form of the invention illustrated in FIG. 2, the valve means provides for exit of fluid from the separator conduit 12 generally laterally thereof, insofar as the lowermost baffle 18a completely blocks the separator conduit 12 below the location of the exit valve means 41. The lowermost section of the conduit means may also be provided with the spiking assembly 16. This spiking assembly may function as a mounting means for positioning the separator conduit 12 in its generally upright posture by penetration into the submerged surface 100 as depicted in FIG. 1.

As may be seen in FIG. 7, the bottom of the lowermost section of the separator conduit 12 may be alternatively provided with a shroud 102 for the valve means 41. This arrangement is envisioned primarily where the separator conduit is clamped or otherwise secured in its generally upright posture rather than being spiked into the submerged surface in the manner depicted in FIG. 1. As shown in FIG. 7, in such instance the valve means 41 may be located at the bottom submerged end of the separator conduit 12. The valve shroud 102 employed to protect the valve means may be flange welded to the separator conduit 12 as indicated at 106. The valve means 41 of FIG. 7, apart from location, structurally and operationally similar to the valve means 41 of FIG. 2.

At this juncture it may be noted that in order to minimize any maintenance problems by reason of location of the valve means 41 below water, the valve means 41 may be located above water and placed in communication with the exit zone 22 of the separator conduit by an additional conduit (not shown) projecting from the exit zone externally of the separator conduit 12, to an above water location. When the exit valve is discussed as being located "adjacent the exit zone," this arrangement, i.e. operational adjacency, is also envisioned in that description. In such instances an additional valve (not shown) may be located adjacent the exit zone 22 and periodically operated to remove any collected sand from the bottom of the separator conduit.

Provision may be made for sampling the quality of the fluid leaving the separator conduit 12 for disposal into the water body 14. Generally this sampling may entail placing of a relatively small conduit 104 in communication with the lower exit zone 22 of the separator conduit as may be seen in FIG. 2. This conduit 104 is in turn suitably connected to a sampling conduit 106 that preferably passes externally of the separator conduit 12 to a location at the upper end of the skim pile assembly. By placing the conduit 104 in communication with the exit zone 22 of the separator conduit 12, the sampling conduit 106 will support a head of fluid to about the level of the fluid in the separator conduit and of a quality substantially equal to that leaving the skim pile assembly at the exit zone 22. Fluid from the upper end of the sampling conduit 106 may be tested at appropriate intervals to determine whether or not satisfactory operating conditions prevail.

As may be seen in FIG. 7, a sampling conduit 108 may be located internally of the separator conduit 12 if desired. This sampling conduit 108 may pass through the riser means and, apart from location functions similarly to the sampling conduit 106 of FIG. 2.

With particular reference to the schematic diagram of FIG. 6 operation of the embodiment of the present invention discussed primarily in connection with FIGS. 1–7 may be more fully understood.

Upon initial installation of the skim pile assembly 10, the valve means 41 adjacent the exit zone 22 of the separator conduit 12 may be in an open position whereby the separator conduit 12 communicates with the water body 14. Thus, the separator conduit 12 will support a standing head of fluid consistant with the mean level 30 of the water body 14.

The exit valve means 41 is then operated so as to assume a closed condition. This is accomplished through a pile pressure introduced to the valve 41 through a conduit indicated at 112. (See also FIGS. 1, 2 and 7.) In the illustrated embodiment this pilot pressure is provided by means of a conventional compressed air or gas supply 114 located at a suitable remote location. Insofar as the preferred pilot pressure for closing the valve 41 in the illustrated embodiments is about 50 psi, and the supply provides compressed air at a pressure of about 125 psi, a suitable conventional pressure reducer 116 may be employed to regulate the supply of air to the valve.

If desired, suitable pressure indicators 118 may be employed in the gas lines 120 and 122 respectively leading to and from the pressure regulator 116. This latter gas line 122 communicates with the conduit 112 leading to the valve means 41 by means of connecting gas line 124. As hereinafter more fully described, the connecting gas line 124 may be employed in connection with monitoring of the operation of the pump means 39 employed at the collection chamber 38.

As indicated at 126, a conventional air or gas operated relay is associated with the conduit 122 leading to the valve 41. This relay 126 provides a vent means for relieving pressure from the valve means 41 so as to permit the valve means 41 to assume an open position. It will be appreciated that the valve means 41 is a normally open, i.e. fail-open valve means. Thus, depending on the condition of the relay 126 the closing pressure will either be supplied to the valve means through the pilot conduit 112 or the pilot conduit 112 will be vented by means of the relay 126.

At 128, a relay body is indicated. This body 128 includes three ports 128a, 128b and 128c which function as an outlet port, a venting port and an inlet port respectively. A trip lever 129 controlled by upper and lower range adjustment nuts 130 and 131 on an operating stem 132 functions to either place the outlet port 128a and the inlet port 128c in communication, or to place the outlet port 128a and the venting port 128b in communication. Normally, the former condition obtains so as to maintain the exit valve 41 closed by pressure in the pilot conduit 112. The position of the operating stem 132 is in turn controlled by the pressure on a diaphragm 133 of the relay 126.

When the pressure on the diaphragm 133 reaches a predetermined high value, the operating stem moves downwardly and the upper adjustment nut 130 snaps the trip level 129 into a position wherein the outlet port 128a and the venting port 128b are in communication. This permits venting of the pilot conduit 112 thereby permitting the fail-open exit valve 41 to open.

When the pressure on the diaphragm 133 thereafter reaches a predetermined low value, the upwardly spring biased operating stem 132 moves upwardly by an amount sufficient to cause the lower adjustment nut 131 to snap the trip lever 129 into a position wherein the outlet port 128a and the inlet port 128c are once again placed in communication. This prevents venting and establishes closing pressure in the pilot line 112 to effect closing of the exit valve means 41.

As will thus be appreciated, the relay 126 thus comprises a snap switching means for effecting snap closure of the exit valve means 41. This snap closure is believed to be particularly desirable from at least two standpoints. In the first instance it appears to create a swirl in the separator conduit 12 in the form of an upwardly traveling shock that tends to coalesce further particles of oil. Secondly, the upward shock like effect tends to push oil collected in the quiescent zones 34 up the riser means. A similar effect may be realized during the initial stages following snap opening.

The snap switching means may be provided by any suitable structure with that illustrated being the relay 126 which may be a snap-acting, three way pneumatic switching valve with a 3–15 psi control, adjustable 50 psi port pressure of the type 168-H available from Fisher Governor Company, Marshalltown, Iowa, and illustrated in its Bulletin C-168. Control of the exit valve means 41 by the relay 126 is accomplished in response to the level sensing means 42.

At this juncture it may be noted that the exit valve means 41 may be provided with throttling means (schematically shown in FIG. 6 at 41a) of any suitable type (e.g. an orifice or valve) so that when the valve means 41 is open,, flow from the separator conduit means 12 is throttled. In this fashion, any tendency to drag oil from the quiescent zones 34 into the flowing zone that might otherwise result from unrestricted flow out of the valve mens 41 is minimized.

It may also be noted that although the waiting time period is discussed herein particularly in conjunction with downward velocity impedance provided by complete valve closure, it is envisioned that such impendance may, in cases of laminar flow, be provided by adjusting the throttled flow from the valve means 41 without completely closing the valve means 41.

In the illustrated embodiment, with a pressure of between 31 psi and 15 psi supplied to the diaphragm 133 of the relay through a suitable conduit indicated at 134, the relay 126 prevents venting and maintains the valve means 41 in a closed position. However, upon an increase in pressure supply to the relay to a level of about 15 psi, the relay, through the snapping of the trip lever 129 permits venting and causes the valve means 41 to open. When the pressure to the relay falls to 3 psi venting is blocked and the valve 41 is caused to snap shut.

Control of the supply of pressurized air to the diaphraghm 133 of the relay 126 is accomplished by means of the separator conduit fluid level control means 42 earlier noted. This control means is provided with a controller-transmitter (liquid level control) 135 having an inlet conduit means 136 and an outlet conduit means 137 associated therewith. Upon a supply of air (from any suitable source) at a pressure of about 20 psi through the inlet conduit means 136, flow out of the controller-transmitter 135 through the outlet conduit means 137 will be at a level in a pressure range of about 3 to 15 psi. Where the main gas supply 114 is utilized to supply compressed air to the controller-transmitter 135, a suitable pressure reducer (not shown) such as that earlier indicated at 116 may be employed to regulate a supply of 20 psi through the inlet conduit 136.

When the fluid level in the separator conduit 12 is sensed by the level control means 42 to be at the lower sensing zone 70, the level control means 42 is conditioned so that flow in the outlet conduit means 137 is reduced to approximately 3 psi. Thus in this condition, about 3 psi is supplied to the relay 126 through the conduit means 134. As earlier noted, venting of the pilot conduit 112 will be blocked in this condition, and the exit valve means 41 will be snapped to a closed position.

Filling of the separator conduit 12 occurs at this point by reason of the essentially continuous supply of fluid thereto so as to provide the desired waiting time. Ultimately, the upper sensing zone 68 is reached thereby producing a 15 psi output to the diaphragm 133 so as to cause venting at the venting port 128b as indicated by the arrow in FIG. 6. The exit valve 41 thus opens, and downward flow of fluid over the baffle means and out the exit zone 22 of the separator conduit 12 through the valve means 41 occurs until the level sensor 42 again senses a drop in fluid level to the lower sensing zone 70. At this point, the outlet from the controller-transmitter 135 of the level control 42 results in a reduced supply of only about 3 psi to the relay, thereby terminating the vent and snapping the valve means 41 shut in the manner earlier discussed.

It will be appreciated that the transitional supply of air to the relay in the range between 3 and 15 psi does not effect its operation since the lever 129 is controlled by the upper and lower adjustment nuts 130 and 131. These only come into play at the 3 and 15 psi pressure levels since they are on the operating stem 132, the position of which is controlled by pressure on the diaphragm 133. It will also be recognized that a purely digital system may be employed for control purposes.

As indicated at 148 a manually operable valve means may provide communication between the outlet conduit 137 from the controller-transmitter 135 and the conduit 134 leading to the diaphragm 133 of the relay 126. In its normal condition, the valve 148 thus permits ultimate control of the exit valve means 41 in response to the level sensor 42. However, if it becomes desirable to open the exit valve means 41 independently of the level sensor 42, this may be accomplished through placing the valve means 148 in a condition wherein the diaphragm 133 of the relay 126 communicates with the aforementioned connecting conduit means 124. In this fashion, the connecting conduit means provides a supply of air under pressure suffficient to permit the relay to cause venting at the location 128a by downward movement of the stem 132 in the manner earlier noted.

Control of the pump 39 at the oil collection chamber 38 is accomplished in a similar fashion. As may be seen in FIG. 6, the oil level sensor 41 is of the same general type as the separator conduit level sensor 42 and is also provided with a controller-transmitter 135'. A suitable supply of air to that controller-transmitter in a manner similar to that earlier described monitors a relay 126' associated with operation of the pummp means 39.

At a predetermined low level 66 in the collection chamber 38, the relay permits venting of a pilot pressure in a pilot line 112' leading to a conventional pilot pressure controlled valve 139. In this condition, the valve 139 is normally closed thereby preventing supply of air from a suitable source to the air operated pump 39 through a supply line indicated at 142.

When the oil reaches the upper predetermined sensing level 64 in the collection chamber 38, venting of the pilot line 112' is blocked and the valve 139 is caused to open by pressure supplied thereto through the pilot line 112'. This permits air to be supplied through the valve 139 to operate the pump 39, i.e. the supply line 142 is placed in communication with air existing in the line 144 leading to the valve 139. When the level in the chamber falls, the pump is disabled, and upon appropriate buildup operation of the pump again commences.

It will be appreciated that the prime superscript used in FIG. 6 in connection with control of the pump 39 indicates elements similar to those discussed in connection with control of the valve means 41. The air operated valve 139 may be of any suitable type such as a one-inch hgih pressure motor valve of the model 1400 SMT type available from Kimray, Inc. Oklahoma City, Okla. If desired, pressure indicators 145 and 145' may be utilized in the pilot or control lines 112 and 112' to indicate operation of the pump and valve.

With reference now to FIGS. 8A–10, a preferred form of the invention wherein the conduit means 12 is in continuous communication with the water body 14 may be more fully understood. The conduit means 12 itself is similar to that discussed in connection with FIGS. 1–6. However, no valve means 41 is provided.

As a result, the exit zone 22 (FIG. 8C) is in continuous communication with the water body 14, the conduit being supported therein in a clamped manner similar to that depicted in FIG. 1. Such continuous communications results in the separator conduit 12 supporting a standing head of fluid, the elevation of which is responsive to changes in the mean water level such as those which may accompany wave action and tidal changes. This mean water level is schematically depicted at 30 in FIG. 8A.

Generally, the skim pile assembly 10 illustrated in FIGS. 8A–8C may be otherwise substantially identical to that discussed in connection with FIGS. 1 and 2. However, the overall length of the portion of the separator conduit submerged in the water body is usually substantially greater insofar as this embodiment of the present invention is envisioned primarily for use in relatively deeper waters.

It may also be noted that the arrangement of the baffles 18 and the riser sections at the uppermost two baffles differs in two respects. Rather than being closed ended, the uppermost riser sections 52 are open ended and freely communicate with the interior of the separator conduit 12. This communication takes place at a zone indicated at 150, which zone is located below the mean water level.

Thus, it may be seen that the riser means functions to transport oil to the upper level of the separator conduit whereby the oil so transported establishes an upper liquid layer of oil at the upper end of the total fluid head supported within the separator conduit 12.

It may additionally be noted that the first and third upper baffle means are provided with enlarged slots 48' at the location corresponding to the apertures 48 which provide communications between the remaining baffles and the riser sections at the quiescent zones 34. The enlarged slots 48' permit weepage of oil from the quiescent zones established by the first two baffle means 18, i.e. oil from those two quiescent zones 34 is permitted to flow upwardly within the interior of the separator conduit 12 without entering the riser means. Thus, the adjacent riser sections pass through these enlarged apertures 48' rather than providing communication with the first two quiescent zones.

The purpose of this arrangement may be more fully understood in connection with the location with the entrance zones 20 for fluid supply into the separator conduit. These entrances zones 20 are established below the level of the first and third baffle means. As illustrated in FIG. 8B, supply of oil containing fluid mixture to the separator conduit 12 may be provided by conduit sections 154 and 156 located internally of the separator conduit 12 and respectively communicating with the supply conduits 24 and 24a. It will be remembered that the the supply conduit 24 is operative to provide the major supply of fluid to the separator conduit while the supply conduit 24a is associated with a filter chamber 78 as discussed in connection with FIG. 2.

As will be apparent, a degree of turbulences may be generated at the locations wherein the open ends of interior conduits 154 and 156 terminate within the separator conduit 12. To avoid the possibility of freshly supplied fluid as opposed to separated oil entering into the riser means, the risers do not communicate with the quiescent zones defined by the first and third baffles as noted above.

At the same time, the effectiveness of the separation treatment occuring at the first two baffle means is enchanced by permitting upward weepage of oil from the quiescent zones beneath the first and third baffle means to the hydrocarbon removal zone i.e. the upper established layer of oil.

Suitably supported in that upper layer of oil, at a fixed location beneath the mean water level 30, is an oil removal pump 157 which may be essentially identical to that pump 39 mentioned in connection with FIG. 2. This oil removal pump may be supported in a slotted housing 158 so as to provide communication between the pump and the upper oil layer.

Also supported within the separator conduit 12 in any suitable manner (such as by means of an open ended conduit 161) are the floats of an interface level sensor 160, the control of which is suitably located above water, such as at the top of the conduit 161.

The structure of this sensor is substantially identical to the level control means 42 earlier described. However, the interface sensing means 160 is operative to sense changes in the level of the interface between the upper oil layer and the remaining fluid contents of the separator conduit between two spaced sensing stations 162 and 164 corresponding to the location of the floats which are operatively connected to the control portion of the sensor, as illustrated. These sensing zones 162 and 164 are located beneath the pump means 157 but at a level above the first baffle 18.

When the interface sensing means 160 senses a low interface at the lower predetermined sensing zone 164, the pump means is responsively operated to cause withdrawal of oil from the upper oil layer within the separator conduit 12. Sensing of the location of the interface at the higher predetermined sensing zone 162 results in responsive disabling of the pump means.

As will be appreciated, the control of the pump means in response to the sensing of interface below the mean water level 30 is particularly advantageous where the total fluid level in the separator conduit 12 is responsive to changes in that mean water level. For example, where wave action or tidal changes cause the total fluid level in the separator conduit 12 to rise to a height wherein the fixedly located pump means 157 would not be in communication with the upper oil layer, the interface sensing means will prevent operation of the pump means 157. Thus, recovery efficiency is further enhanced through minimizing the possibility of withdrawal by the oil removal pump of fluids other than oil.

At the same time, if changes in the mean water level cause the total fluid level to drop to a point wherein the interface reaches the lower sensing station or zone 164, the pump means 157 will be activated so as to withdraw already collected oil prior to the oil finding a level in the separator conduit which would result in mixture of the previously separated and collected oil with newly supplied fluid so as to reduce oil recovery efficiency.

The control of the oil removal pump means in response to sensing of interface below the mean water level is an independently significant facet of the present invention. However, it is preferably employed in conjunction with a provision for waiting time which permits rising of oil into the quiescent zones established by the baffles 18. According to a preferred form of the present invention this is accomplished by rendering intermittant the supply through the main supply conduit means 24 and 154.

This may be accomplished through connection of the main supply conduit to a settling tank or the like schematically indicated at 165. The settling tank may be provided with a level control means 166 substantially identical to the level control means 42 discussed in connection with FIGS. 2 and 6.

This level controls means 166 may be utilized to provide an intermittant supply of fluid from the settling tank 165 or the like to the separator conduit 12, consistant with the rate of fluid exit from the bottom of the separator conduit. In other words, upon an initial supply of fluid to the separator conduit 12, flow is set up in that conduit until such time as the supply of fluid ceases and the fluid level of the conduit reaches a resting point by reason of communication of the conduit 12 with the water body 14.

At this point, the fluid in the separator conduit 12 is permitted to remain at rest for a time period during which buildup may occur in the settling tank 165. During this buildup, the waiting time period required for rising of oil particles into the quiescent zones 34 is established. When the buildup in the settling tank reaches a desired level associated with that time period, the supply of fluid to the separator conduit 12 is renewed.

Calculations for waiting time may proceed along lines similar to those discussed above.

Controls associated with the oil removal pump 157 and the interface sensing means 160, as well as the controls associated with the intermittant supply of fluid in conjunction with the level sensor 166 at the settling tank 165, may be provided by gas or air operated systems similar to those described in connection with FIG. 6 and need not be described in further detail in view of the earlier discussion.

In all forms of the present invention, an additional control may be provided. This control may be associated with a level sensor 168 for sensing a predetermined high level of total fluid in the separator conduit 12. This level sensor 168 may be similar to the other level sensors previously described, and, through appropriate conduit connections for air supply, may function to cause the production operation with which the skim pile assembly 10 is associated to cease.

Referring again to FIG. 8C and FIGS. 9 and 10, the provision for two fluid sampling means particularly adaptable for use when the conduit 12 is in continuous communication with the water body 14 may be appreciated. One of these sampling means may be constituted by a conduit 170 (see FIG. 10) suitably mounted for communication with the exit zone 22 of the separator conduit 12 as indicated at 172.

This communication is provided by means of a brass plug 174 or the like having a relatively small aperture 176. For example, the aperture 176 in the brass plug 174 may be approximately 1/8 of an inch as compared with the diameter of the conduit 170 about 178 inch. A suitable connector 178 provides communication between the flexible conduit 170 and the aperture in the brass plug.

Received generally coaxially within the steel conduit 170 is a flexible tube 182 having a diameter of, for example ¼ inch. At a suitable remote location gas such as compressed air from an appropriate supply may be supplied through the inner tube 182.

This inner tube communicates with the outer tube adjacent the lower end thereof, i.e. in the zone of the connector 178. Thus, the supply of gas functions to force fluid in the outer tube upwardly to the remote location at which the fluid contents may be tested. As will be apparent, the relatively small diameter of the brass plug while permitting the outer tube to fill with fluid from the lower level of the separator conduit 12, is sufficient to permit the forcing of fluid in the sampling conduit upwardly As will be appreciated, the tubes 170 and 182 may be disposed within the riser sections 52. Such an arrangement is depicted in FIG. 9 where a sampling assembly similar to that of FIG. 10 is illustrated in conjunction with sampling at a level substantially above the exit zone 22. In this fashion, relative efficiency of separation at various levels may be determined.

In summary, as in the case of the embodiments of FIGS. 1–6, the embodiment of the present invention depicted in FIGS. 8–10 is operated by input fluid introduced into the entry zone 20 of the separator conduit 12. In both cases, this fluid moves through the flowing zone generally centrally of that conduit along the tortuous path 35 over the baffles 18. The flow over and around the baffles, usually in a generally turbulent condition, stimulates coalescence of droplets of oil in the fluid. At the same time, sand if present in the input fluid collides with and moves across the tops of the baffles thereby stimulating separation and further coalescence of oil by effecting a cleansing of the sand.

Each droplet of oil has a natural tendency to rise by reason of its relatively low specific gravity. This tendency toward upward movement, of course, depends upon the size of the droplet, with the larger droplets having greater rising velocities. Therefore as sequential coalescence phenomena provide progressively larger droplets, the component of the rising velocity increases.

Particles of oil which find their way into the quiescent zones 34, are essentially isolated from the flowing zone. It should be noted that a degree of turbulence in the flowing zone may result in partial turbulence in the quiescent zones and subsequent "washing out" of some particles from those zones into the flowing zone. Generally, however, particles finding their way into the quiescent zones are essentially isolated.

Flow downwardly through the conduit and out the exit zone 22 is interrupted by impeding the downward velocity of fluid for a waiting time period preferably calculated so as to be sufficient for the particles of oil of a predetermined smallest size to rise from the flowing zone into the quiescent zones 34 when the exit velocity (which otherwise might carry the particles downwardly by reason of its exceeding the particle rising velocity) is reduced. Once into a quiescent zone, a droplet may continue to rise even though flow through the flowing zone is resumed.

In the FIG. 8A-8C embodiment, when the oil-remaining fluid interface reaches the desired lower level indicating the existence of a sufficient amount of collected oil in the upper layer, the oil removal pump 157 is activated. Even apart from changes in the mean water level, it will be apparent that withdrawal of fluid by that pump will be accompanied by a rise in the interface level by reason of the communication between the separator conduit 12 and the water body 14. When the interface reaches the higher level, the oil removal pump is shut down.

SUMMARY OF ADVANTAGES

Through the foregoing it may be seen that according to the present invention a particularly advantageous method and apparatus for recovering oil is provided.

Of particular significance is the baffle assembly arrangement which provides for a large number of sequential coalescence phenomena. In this connection the baffle spacing is of particular importance. At the same time, the baffle arrangement is significant from the standpoint of providing quiescent zones for accumulation of oil essentially isolated from flowing zones.

It may also be noted that structure space for the skim pile assembly is minimal since it could depend from a deck.

Also of importance is the provision in the present invention for the handling of large quantities of produced fluid at a rate consistent with production capacity, while at the same time enhancing efficient recovery of separated hydrocarbons and minimizing pollution problems. In this connection, the provision for waiting time periods sufficient to break out particles from the flowing zone through the conduit into a quiescent zone defined by the baffles is particularly advantageous.

Of additional significance is the control of a valve means at the exit zone of a conduit so as to increase flowing distance during which sequential coalescence phenomena take place. This feature of the present invention is significantly advantageous in connection with a mounting in a body of water whereby the overall flowing distance attributable to the mean depth of the water body in which the conduit is mounted does not hamper efficient oil recovery and fluid disposal. Land locations are also envisioned.

The provision for control of an oil removal pump in response to mensing of interface below the mean water level with which the separator conduit is in continuous communication is of independent significance, particularly insofar as it minimizes or obviates problems associated with changes in that mean water level.

Additional advantages are provided through the sampling techniques according to the present invention wherein monitoring of the fluid disposed of is facilitated.

Although the invention has been described in conjunction with preferred forms thereof, it will be appreciated by those skilled in the art, that additions, modifications, substitutions, and deletions may be made without departing from the spirit or scope of the invention as defined in the appended claims.

What is claimed is:

1. A method of recovering oil from an oil-containing fluid mixture at an oil-handling facility located adjacent a body of water and disposing of the relatively oil-free fluid into the body of water, the method utilizing an elongate separator conduit means, the method comprising:

disposing the separator conduit means in a generally upwardly extending posture with an exit zone thereof in continuous communication with the body of water beneath the surface thereof to establish within the separator conduit means a fluid column to a height responsive to the mean water level of the body of water; supplying an oil-containing fluid mixture into the fluid column within the separator conduit means to cause the fluid in the separator conduit means to flow downwardly through a flowing zone established along the separator conduit means and over a plurality of baffle means spaced along the flowing zone to induce coalescent separation of oil from the fluid;

intermittently interrupting the supply into the fluid column to impede the downward velocity of fluid in the flowing zone for a waiting time period sufficient to permit oil to rise from the flowing zone into quiescent zones defined by the baffle means adjacent the undersides thereof;

flowing oil accumulated in the quiescent zones upwardly in the separator conduit means along a flow path essentially isolated from the downward flowing zone to the upper region of the fluid column therewithin so as to establish an upper oil layer of the fluid column;

said oil flowing step including the step of flowing oil accumulated in lower ones of the quiescent zones through upper ones of the quiescent zones;

sensing, at a location below the mean water level of the body of water, the interface between the upper oil layer and fluid of the fluid column therebelow;

controllably withdrawing oil from that upper oil layer in response to sensing of that interface;

flowing relatively oil-free fluid from the exit zone of the separator conduit means into the body of water beneath the surface thereof; and the supply of the oil-containing fluid mixture into the fluid column being at a level in the separator conduit means below a predetermined low interface level.

2. The method according to claim 1 wherein the step of controllably withdrawing oil from the upper oil layer further comprises:

sensing the predetermined lower interface level and withdrawing oil from that layer in response to the sensing of that lower level; and sensing a predetermined upper interface level and blocking withdrawal of oil from that layer in response to the sensing of that upper level.

3. A method of recovering oil from an oil-containing fluid mixture at an oil-handling facility located adjacent a body of water and disposing of the relatively oil-free fluid into the body of water, the method utilizing an elongate separator conduit means, the method comprising:

disposing the separator conduit means in a generally upwardly extending posture to establish a flowing zone downwardly along the conduit means, the disposition of the conduit means being such that the conduit means projects into the body of water and an exit zone thereof is located in a position operable to dispose of fluid into the body of water beneath the surface thereof;

establishing and maintaining a fluid column within the separator conduit means to a height above the mean water level of the body of water;

supplying an oil-containing fluid mixture to a fluid entrance zone of the separator conduit means;

causing the fluid in the separator conduit means to flow downwardly through the flowing zone established along the separator conduit means and over a plurality of baffle means spaced along the conduit means to induce coalescent separation of oil from the fluid;

intermittently impeding the downward velocity of fluid in the flowing zone for a waiting time period sufficient to permit oil to rise from the flowing zone into quiescent zones defined by the baffle means adjacent the undersides thereof;

flowing oil accumulated in the quiescent zones upwardly in the separator conduit means along a flow path essentially isolated from the downward flowing zone and into an oil accumulation chamber communicating with the separator conduit means at a location above said mean water level of the body of water and isolated from the downward flowing zone;

said oil flowing step including the step of flowing oil accumulated in lower ones of the quiescent zones through upper ones of the quiescent zones; and flowing relatively oil-free fluid from the exit zone of the separator conduit means into the body of water beneath the surface thereof.

4. The method according to claim 3 wherein:

the steps of establishing and maintaining said fluid column and of intermittently impeding said downward velocity comprise controlling exit valve means at said exit zone.

5. The method according to claim 4 wherein the step of controlling said exit valve means comprises:

sensing a predetermined low level of fluid in the conduit means; and closing the valve means in response to the sensing of that low level.

6. The method according to claim 5 wherein the step of controlling said exit valve means comprises:

sensing the predetermined high level of fluid in the conduit means; and opening the valve means in responses to sensing of that high level.

* * * * *